DECODING AND INFORMATION INDICATING DEVICE

Filed Feb. 18, 1957

INVENTOR.
THOMAS H. TATHAM, Jr.
BY Egon W. Mueller
ATTORNEY

United States Patent Office 2,829,302

Patented Apr. 1, 1958

2,829,302

DECODING AND INFORMATION INDICATING DEVICE

Thomas H. Tatham, Jr., San Diego, Calif., assignor to General Dynamics Corporation, Rochester, N. Y., a corporation of Delaware Application February 18, 1957, Serial No. 640,919

5 Claims. (Cl. 315—8.5)

This invention relates generally to a device for decoding and indicating predetermined coded information in an intelligible visual display. More particularly, the device includes a cathode ray tube capable of shaping the cross-section of its electron beam in response to the coded information.

In modern-day high-speed electronic computers of various types there is a constant need for the display of random value coded information in an intelligible form for visual viewing. Many mechanical or electro-mechanical devices are utilized presently to give numeric, symbolic or other intelligible information indication of the desired sampling or display of predetermined coded information. The difficulty with these devices resides in their inherent inertia. The instant invention accomplishes both the decoding of the predetermined information and a translation of that information into intelligible form or characters substantially without time lag or inertia through utilization of electronically responsive components.

The invention includes generally, an envelope in the shape of a normal cathode ray tube which has positioned therein and at one end thereof a well known electron beam generating means such as a thermionic cathode. A phosphorescent screen capable of responding to the electron emission may be positioned at the other end of the tube. Intermediate the screen and the cathode is positioned a beam shaping member which has formed therethrough, stencil-like openings corresponding to information symbols predetermined by the code to be presented for translation and display by the tube. Intermediate the matrix and the cathode are positioned at least two electron beam deflection systems. Each system includes at least two pair of deflection means, each of which pair of deflection means is capable of deflecting the beam in substantially one of the rectangular coordinate directions. Each pair of the deflection means is so arranged that between each of the pair of deflection means there may be established at least two deflection potential conditions. Various circuitry is included in the invention to effect the establishment of the deflection potential conditions. It can then be seen that by properly selecting potential conditions for each of the pair of deflection means or varying other conditions, as will be hereinafter explained, a rather simple and trouble-free decoding and information indicating device is achieved.

This invention utilizes and improves the apparatus disclosed in a copending application of Joseph T. McNaney, Serial No. 297,480, assigned to the common assignee hereof.

It is an object of this invention to provide a device capable of decoding a predetermined code and substantially simultaneously therewith indicating the decoded equivalent.

It is another object of this invention to provide a relatively simple and trouble-free device for decoding and information indicating of a predetermined code.

It is another object of this invention to provide a device for decoding and indicating intelligible information in response to a predetermined code which device is flexible and can be adapted to any desired predetermined code.

Objects and advantages other than those set forth above will be apparent when read in connection with the accompanying specification and drawings, in which.

Figures 1, 2, 3:
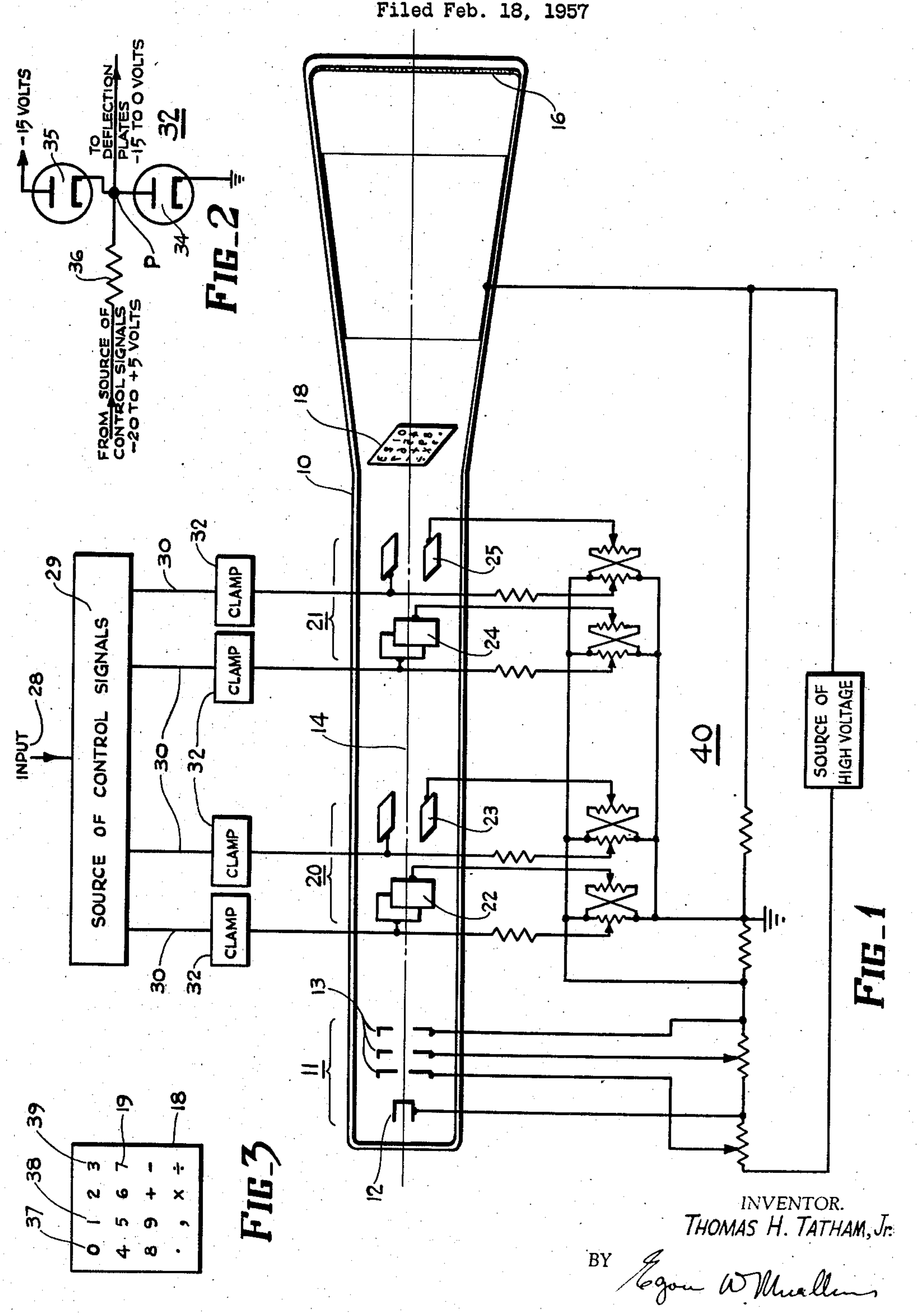
Figure 1 is a diagrammatic view showing a decoding and information indicating device including a cathode ray tube and its schematic operative connections embodying the present invention.
Figure 2 is a schematic view of a clamping circuit capable of being utilized in the schematic of Figure 1.
Figure 3 is an enlarged detail view of a beam shaping member.

Referring to Figure 1, there is presented an evacuated envelope 10 preferably shaped in the form of a cathode ray tube. Positioned within and at one end of the envelope or tube 10 is an electron beam generating means 11 including a well known electron generating cathode 12 and a plurality of known accelerating electrodes 13. The accelerating electrodes 13 being capable of forming an electron beam and projecting that beam generally along the axis 14 of tube 10. Positioned within and on or adjacent the opposing end of the tube 10 is an electron responsive target or screen 16. While any known electron responsive target may be utilized, the target 16 in the instant invention is preferably capable of translating the impingement of the electron beam thereupon into a light image for direct visual viewing. Intermediate the screen 16 and the electron beam generating means 11 is disposed a beam shaping member or matrix 18, shown in detail in Figure 3. The matrix 18 selectively shapes the electron beam into one or more desired cross-sections 19. Any desired cross section 19 may be formed through the matrix material. The desired cross sections generally correspond to the demands of a predetermined code to be translated therewith. It should be realized that any desired number of characters, information symbols or cross sections 19 can be formed in the matrix 18, the instant embodiment utilizing sixteen predetermined cross-sections in the matrix, is exemplary only and does not so limit the invention. Each information symbol 19 in the matrix 18, however, will require one predetermined set of potential conditions.

Positioned within the envelope 10 and intermediate the matrix 18 and the electron beam generating means 11 are a plurality of deflection systems 20, 21. The plurality of deflection systems may be one or more, but is herein exemplified as two such systems 20, 21. Each system is capable of deflecting the electron beam in substantially rectangular coordinates. Each of these systems may be either of an electromagnetic or electrostatic construction, but is herein exemplified as comprising two pair of deflection means in quadrature to each other and shown as electrostatic horizontal and vertical deflection plates 22, 23, 24 and 25. The first deflection system 20 includes deflection means 22 and 23, namely, horizontal plates 22 and vertical plates 23 and the second deflection system 21 includes deflection means 24, 25, namely, horizontal plates 24 and vertical plates 25. The deflection systems 20, 21 together, are capable of deflecting the beam along a plurality of positions corresponding to the openings 19 in the matrix 18 in a rectangular coordinate manner of deflection. Any desired plurality of deflecting conditions may be effected by the deflection system or systems, and it is within the contemplation of the invention to include one or more deflection systems if desired to permit varying selection possibilities, increasing or decreasing the number of information symbols which may be presented or illuminated.

The deflection systems 20, 21 may be so arranged that two possible values of deflection potential conditions, such as exemplified, which are predetermined, may have varying effect when applied between differing pairs of deflection plates 22, 23 and 24, 25 wherein the deflection plates themselves may be positioned closer to or further from the beam, or may be so constructed as to present different intensities of deflection to the beam such that the deflection intensity may be doubled or halved, for example, as desired. In all of the aforestated ways, it is possible to enlarge the combinations or varying conditions which may be achieved by utilizing the teachings of the instant invention.

As exemplified in Figure 1, an input or predetermined intelligence code 28 is presented to a source of control signals 29. The source of control signals 29, may, if the input be binary code be a digital to analogue conversion unit such as is taught in the copending application of Joseph T. McNaney, Serial No. 340,245, filed March 4, 1953, assigned to the common assignee hereof. Should the code 28 be analogue, it could be directly applied by the source 29 of control signals without conversion. The invention, therefore, has considerable breadth in that it may be altered by one skilled in the art to accept various codes. The codes 28, of course, predetermine the information symbols 19 to be presented from the beam shaping member 18.

The output analogue voltages 30 may then be presented to a circuit 32 which holds the amplitude extremes of the output voltage waveform to given reference levels. A simple known circuit 32 to accomplish this is shown in Figure 2. The circuit, being exemplary, such as a clamp or clamping circuit, utilizes diode type clamping of the output voltage. Assuming, for example, that the voltage signals 30 from the source of control signals 29 varies from —20 volts to +5 volts, and diode 34 has its cathode connected to ground and its plate to a point P, and, diode 35 has its cathode connected to point P and its plate to —15 volt potential. The source of control signals 29 and the cathode of diode 34 are connected to common ground. It can be seen that any voltage 30 from the source of control signals 29 in excess of 0 volt or less than —15 volts will appear across resistor 36, the output at point P will be 0 volt and —15 volts, two potential conditions. For purposes of explanation, let it be assumed that one of these potential conditions be designated as "On" and the other as "Off." Referring to the exemplary sixteen character matrix 18, shown in Figure 3, be it assumed for explanatory purposes, that when plates 22, 23, 24 and 25 are all "Off" the opening or symbol "O" 37 will be illuminated and the beam shaped into a corresponding configuration presenting "O" for visual display on screen 16. Then, if plate 22 alone is "On" and the others "Off" the beam will be caused to pass through "1" 38 shaping the beam correspondingly. If plates 22 and 24 are both "On" and plates 23 and 25 "Off" the beam will pass through 39. As can be seen in the exemplified embodiment, using two potential conditions and sixteen symbols in the beam shaping member, the two deflection systems 20, 21 permit sixteen corresponding positions of the beam by turning On or Off the potentials applied to the various deflection plates. In this manner, the tube 10 with the predetermined potential conditions decodes the predetermined code 28 and into the corresponding information for display of the proper information symbol 19 upon the target or screen 16.

Various exemplified energizing circuitry 40 including a source of high voltage may be utilized to furnish appropriate operating voltages and power requirement to the tube 10.

It should be apparent that the device as shown in Figure 1 could utilize information in the form of analogue, binary, binary coded decimal or other code by merely changing the parameters aforementioned.

It will be obvious to those skilled in the art that the illustrated embodiment of the invention may be variously changed and modified, or features thereof, singly or collectively, embodied in other combinations than those illustrated without departing from the spirit of the invention, or sacrificing all of the advantages thereof, and that accordingly, the disclosure herein is illustrative only and the invention is not limited thereto.

I claim:

1. A decoding and information-indicating device responsive to a predetermined intelligence code, said device including an evacuated envelope having positioned therein at one end thereof a beam generating means and at the other end thereof an electron responsive target, beam shaping means positioned within the envelope intermediate the generating means and the target for selectively shaping the electron beam into information symbols, at least a first deflection system and at least a second deflection system, said systems being spaced from each other within and along the envelope and positioned intermediate the shaping means and the beam generating means, each of said systems having at least two pairs of deflection means, one of said two pair of deflection means being capable of exerting deflection potentials substantially in quadrature with the other, said pairs of deflection means being capable of effecting predetermined deflection of the electron beam, means capable of selectively supplying at least two potential conditions to each of said pair of deflection means of each of said systems, each of said pairs of deflection means being selectively capable of responding to at least one of said potential conditions in response to the predetermined intelligence code, said deflection means selected by said code being adapted to cause positioning of said beam through the information symbol in said shaping means and presenting said symbol upon said target thereby substantially simultaneously decoding and indicating said predetermined intelligence code.

2. A decoding and information-indicating device responsive to a predetermined intelligence code, said device including an evacuated envolope having positioned therein at one end thereof a beam generating means and at the other end thereof an electron responsive target, beam shaping means positioned within the envelope intermediate the generating means and the target for selectively shaping the electron beam into information symbols, at least a first deflection system and at least a second deflection system, said systems being spaced from each other within and along the envelope and positioned intermediate the shaping means and the beam generating means, each of said systems having at least two pairs of electrostatic deflection plates, one of said two pair of deflection plates being capable of exerting deflection potentials substantially in quadrature with the other, said pairs of deflection plates being capable of effecting predetermined deflection of the electron beam, means capable of selectively supplying at least two potential conditions to each of said pair of deflection plates of each said systems, each of said pairs of deflection plates being selectively capable of responding to at least one of said potential conditions in response to the predetermined intelligence code, said deflection plates selected by said code being adapted to cause positioning of said beam through the information symbol in said shaping means and presenting said symbol upon said target thereby substantially simultaneously decoding and indicating said predetermined intelligence code.

3. A decoding and information-indicating device responsive to a predetermined intelligence code, said device including an evacuated envelope having positioned therein at one end thereof a beam generating means and at the other end thereof an electron responsive target, beam shaping means positioned within the envelope intermediate the generating means and the target for selectively shaping the electron beam into information symbols, a first deflection system and a second deflection system, said systems being spaced from each other within and along the envelope and positioned intermediate the shaping means and the beam generating means, each of said systems having two pairs of deflection means, one of said two pair of deflection means being capable of exerting deflection potentials substantially in quadrature with the other, said pairs of deflection means being capable of effecting predetermined deflection of the electron beam, means capable of selectively supplying at least two potential conditions to each of said pair of deflection means of each of said systems, each of said pairs of deflection means being selectively capable of responding to the selected condition of said potential conditions in response to the predetermined intelligence code, said deflection means selected by said code being adapted to cause positioning of said beam through the information symbol in said shaping means and presenting said symbol upon said target thereby substantially simultaneously decoding and indicating said predetermined intelligence code.

4. A decoding and information-indicating device responsive to a predetermined intelligence code, said device including an evacuated envelope having positioned therein at one end thereof a beam generating means and at the other end thereof an electron responsive target, beam shaping means positioned within the envelope intermediate the generating means and the target for selectively shaping the electron beam into information symbols, a first deflection system and a second deflection system, said systems being spaced from each other within and along the envelope and positioned intermediate the shaping means and the beam generating means, each of said systems having two pairs of electrostatic deflection plates, one of said two pair of deflection plates being capable of exerting deflection potentials substantially in quadrature with the other, said pairs of deflection plates being capable of effecting predetermined deflection of the electron beam, means capable of selectively supplying at least two potential conditions to each of said pair of deflection plates of each of said systems, each of said pairs of deflection plates being selectively capable of responding to the selected condition of said potential conditions in response to the predetermined intelligence code, said deflection plates selected by said code being adapted to cause positioning of said beam through the information symbol in said shaping means and presenting said symbol upon said target thereby substantially simultaneously decoding and indicating said predetermined intelligence code.

5. A decoding and information-indicating device responsive to a predetermined intelligence code, said device including an evacuated envelope having positioned therein at one end thereof a beam generating means and at the other end thereof an electron responsive target, beam shaping means positioned within the envelope intermediate the generating means and the target for selectively shaping the electron beam into at least one of sixteen predetermined information symbols, a first deflection system and a second deflection system, said systems being spaced from each other along the envelope and positioned intermediate the shaping means and the beam generating means, each of said systems having two pairs of electrostatic deflection plates, one of said two pair of deflection plates being capable of exerting deflection potentials substantially in quadrature with the other, said pairs of deflection plates being capable of effecting predetermined deflection of the electron beam, means capable of selectively supplying two potential conditions to each of said pair of deflection plates of each of said systems, said pairs of deflection plates being selectively capable of establishing sixteen discrete potential conditions, one such condition for illumination of each of said symbols, said deflection plates selected by said code being adapted to cause positioning of said beam through the information symbol in said shaping means and presenting said symbol upon said target thereby substantially simultaneously decoding and indicating said predetermined intelligence code.

No references cited.